United States Patent
Fang et al.

(10) Patent No.: US 6,519,654 B1
(45) Date of Patent: Feb. 11, 2003

(54) METHOD OF DESIGNING AN INTERFACE FOR A REAL-TIME MESSAGING SYSTEM

(75) Inventors: Henry Fang, Cerritos, CA (US); Jeffrey Nicholson, Huntington Beach, CA (US)

(73) Assignee: Sharp Laboratories of America, Incorporation, Camas, WA (US)

( * ) Notice: Subject to any disclaimer, the term of this patent is extended or adjusted under 35 U.S.C. 154(b) by 0 days.

(21) Appl. No.: 09/349,059

(22) Filed: Jul. 7, 1999

(51) Int. Cl.[7] .................................................. G06F 9/54
(52) U.S. Cl. ...................................... 709/321; 709/328
(58) Field of Search ................................ 709/310–320, 709/328

(56) References Cited

U.S. PATENT DOCUMENTS

| | | | |
|---|---|---|---|
| 5,410,650 A | 4/1995 | Sasaki et al. | 709/250 |
| 5,515,536 A | 5/1996 | Corbett et al. | 709/315 |
| 5,758,159 A | 5/1998 | Collet | 709/315 |
| 5,872,956 A | 2/1999 | Beal et al. | 709/224 |
| 6,393,496 B1 * | 5/2002 | Schwaderer et al. | 709/328 |

OTHER PUBLICATIONS

Shear, David, "Three DSP RTOSs are ready to merge with Windows", EDN, v39, n13, pp.(5), Jun. 23, 1994.*
Nigro et al., "RTO++: a framework for building hard real-time systems", Journal of Object–Oriented Programming, vol. 6, No. 2, pp. 35–47, May 1993.*

* cited by examiner

Primary Examiner—St. John Courtenay, III
(74) Attorney, Agent, or Firm—Marger Johnson & McCollom, P.C.

(57) ABSTRACT

A method of designing an interface for a messaging system for networks. The method includes the steps of providing a system interface to communicate with an operating system and driver level communication drivers, and using an application interface for transferring payload data between application objects and the system interface. The method could be applied in networks that include both application-level applications and driver-level device drivers.

9 Claims, 2 Drawing Sheets

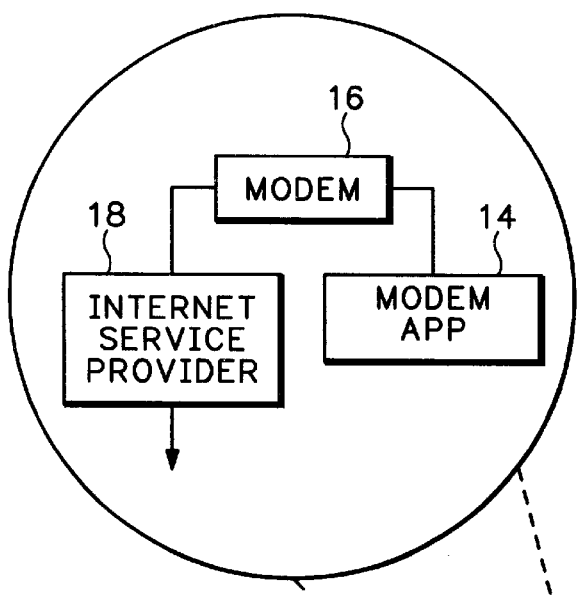
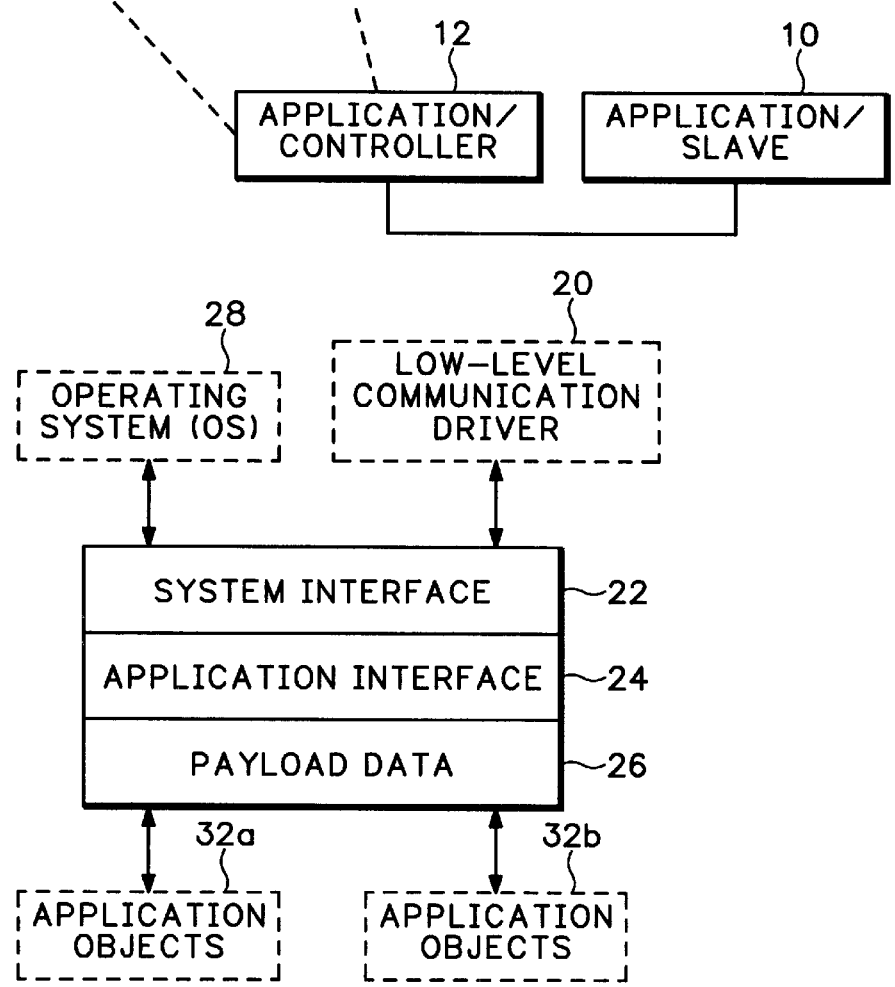
FIG.1
FIG.2

METHOD OF DESIGNING AN INTERFACE FOR A REAL-TIME MESSAGING SYSTEM

BACKGROUND OF THE INVENTION

1. Field of the Invention

This invention relates to software development methods, more specifically to software development methods for real-time operating system communication protocols.

2. Background of the Invention

Electronic devices of all types now have the ability to communicate with other devices and users. Some of these devices will be described as application-level, meaning that they communicate using application-level protocols. Devices using driver-level communication protocols will be described as driver-level. As communication protocols are developed, they need to take into account both of these types of protocols.

However, current designs sacrifice the application-level protocols and rely on the driver-level protocols implemented in the driver-level devices. This leaves the system dependent upon these detailed implementations, rather than adaptable to changes in system architecture or underlying system implementation. One of the underlying problems lies in the nature of the software design. Therefore, a method and framework for designing modular software for these systems is needed.

SUMMARY

One aspect of the invention is a method of designing an interface for a real-time operating system. The interface is divided into layers, in which each layer is at least partially separated from the other layers. An application interface communicates between the system interface and the payload data. In a partially separated embodiment, the payload data is not completely separated from the application interface, which reduces the workload of the messaging system controller. In a wholly separated embodiment, the payload data is completely separated from the application interface, which increases the designability of the interface, but increases the workload of the controller.

Examples of the operating system include Windows CE™, pSOS, OS9, VxWorks. Examples of the applications include HAVi, TCP, and proprietary applications. Examples of the driver level communication drivers include IEEE 1394, EtherNet, and XDSL.

BRIEF DESCRIPTION OF THE DRAWINGS

FIG. 1 shows a block diagram representation of network environment in accordance with the invention.

FIG. 2 shows a block diagram representation of interface layers in accordance with the invention.

DETAILED DESCRIPTION OF THE PREFERRED EMBODIMENTS

Figure 3:
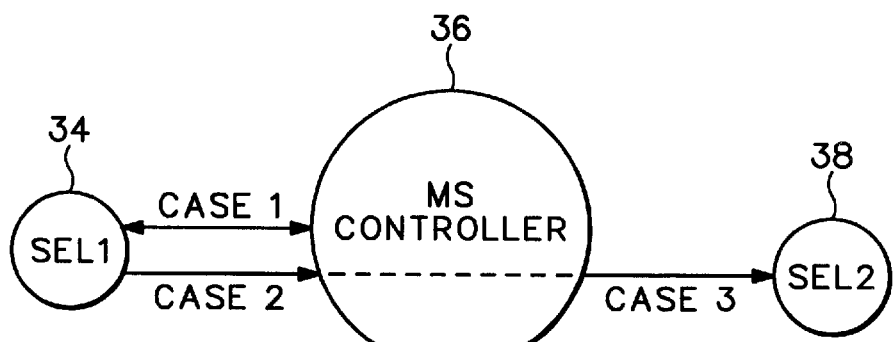
FIG. 3 shows a block diagram representation of elements on a network in accordance with the invention.

FIG. 1 shows an example of a network for which software must be designed on several levels. Device 10 is referred to as a slave device. This is a device that has no network intelligence. If it is connected to a network, it has no internal way of acknowledging its presence on the network and cannot directly use or control other devices. Examples of these types of devices could include present-day VCRs, camcorders, cameras, televisions and audio systems and components.

The slave 10 is connected to a controller 12. A controller has network intelligence, capable of identifying itself and communicating with other devices on the network. Additionally, a controller is capable of managing a network of devices and can either use other devices directly or command specific devices to interoperate with one another. Only one controller is allowed to be active in a given network. If multiple controllers are installed, negotiation must occur to elect which controller will be active. Controllers that are not active operate as slave devices. Examples of controller devices could be personal computers, home network control modules, or intelligent consumer electronics such as digital television sets.

In the exploded view of the controller 12, the application example is that of a modem application. The modem application 14, whatever software it is that will control the modem, operates the modem 16 to connect through an Internet Service Provider 18 to the Internet. An example of such an instance would be downloading video from the Internet for display on the controller 12.

The messaging and communications protocols among these devices are problematic to design. The basis for the network could be IEEE 1394 bus structures, home RF communications, EtherNet, etc. Each one of these types of connections has a driver associated with it, with which the network must use to communicate. Additionally, the application running has protocols and requirements for which the network must account. Designing software for these types of networks typically requires a case-by-case design for each combination of operating system, application, drivers and application objects on the network.

One application of this invention is to provide an interface design that separates, either completely or partially, the application, the operating system, and the data being transferred. One example of such an interface is shown in FIG. 2.

As can be seen, the interface is divided into separate layers. Layer 22, the system interface layer, interacts with the operating system 28 and the driver level communications drivers 20 such as 1394, EtherNet, etc. The application interface layer 24 contains all of the necessary structures for handling the application, such as HAVi or TCP. The payload data 26 is that data that is created or received by the application objects 32a and 32b.

In this manner, changes in one layer do not necessitate changes in the other layers. For example, assume the software was originally written for a pSOS operating system running HAVi. If the design were changed to go to the Windows CE operating system, only the system interface would have to be changed. Similarly, only the system interface would have to be changed if a new type of communication driver is integrated into the system. Likewise, if the application were changed from HAVi to TCP, only the application interface would be changed. If new application objects are added, some manipulation of the format of payload data may have to occur.

To assist in a more clear understanding of the invention, and not with any intention of limiting application of this invention, refer back to FIG. 1. An example of such a network runs an application called Home Audio Video interoperability (HAVi). The devices communicating through the application, such as those mentioned above will be referred to as application objects. The application runs on an operating system, which for this example will be assumed to be pSOS™. In this example, then, the slave device 10 would be referred to as a basic audiovisual device, or BAV. The controller devices will be either intermediate audiovisual devices (IAV), if they are proprietary controllers, or full audiovisual devices (FAV), if they are standard controllers. For the example of FIG. 1, the device 12 will be an FAV. It is assumed that the controller 12 will control the BAV 10 to display information received across the modem.

Figure 4A:
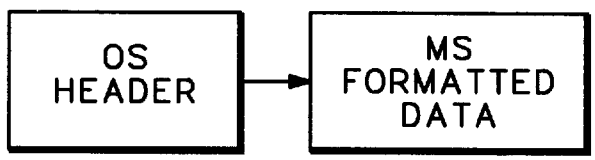
FIGS. 4a–4c show message structures for elements on a network in accordance with the invention.

Having set forth both a general case and a specific example for the structure, as well as the structure of the interface, the discussion now turns to operation of the interface between different elements on the network. The interface is not tied to any specific operating system or application The operation of the interface can be better understood by referring to FIGS. 3 and 4a–4c. In FIG. 3, two different software elements, SE1, 34, and SE2, 38, of the application are shown communicating through a messaging system (MS) controller 36. Three different cases are used to illustrate the operation of the interface. In case one SE1, 34, is added to the network and needs to identify itself to the MS controller 36. The format of the message is shown in FIG. 4a.

SE1, 34, sends an operating system header that identifies the element for the messaging system. The header includes information on the communication state, source identification, identification of its message queue, and other types of identifiers. That header is sent using the system interface. The header is attached to messaging system-formatted data.

In case 2, SE1, 34, sends a message to SE2, 38, through the MS controller 38. It must be noted that this interface does not act exactly as shown in FIG. 2. If the interface acted exactly as shown in FIG. 2, the MS controller 36 would have to receive the data, reformat the MS formatted data portion and then pass the information contained in the application data. This has an adverse impact on the system efficiency because of the high MS controller workload.

Figure 4B:
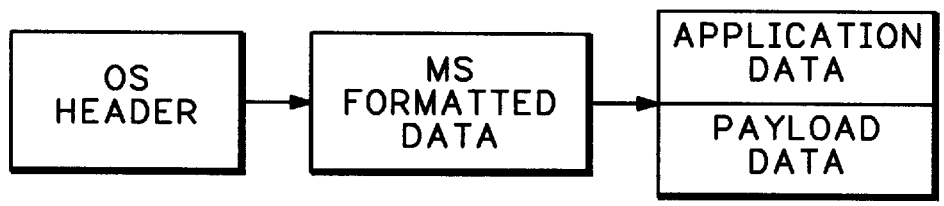
Figure 4C:
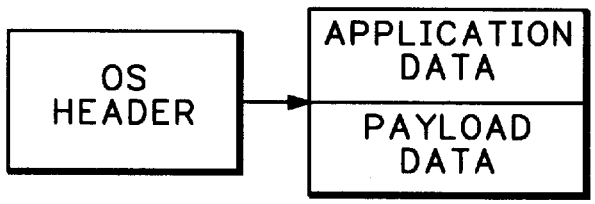

As can be seen in FIG. 4b, the current example does not function quite that way. SE1 sends the operating system header, the MS formatted data, the application data and the payload data to the MS controller. The MS controller uses the operating system header and MS formatted data to identify the destination SE and the transmission method, and then sends it as FIG. 4c. The operation is a 'no look' operation, where the MS controller does not do any type of analysis of the application data or the payload data—it merely strips off the MS formatted data and passes the application/payload data.

Other alternatives and modifications of the design of the interface are possible. As mentioned above, the example reduced the MS controller workload and increased the efficiency of the system by passing application and payload data in a 'no look' mode. However, this ties the payload data to the application interface such that they are not completely independent. An alternative approach is to make the payload data completely independent. However, this results in increased workload for the controller and reduces the efficiency of the system, since the MS controller has to look at and reformat the data prior to sending it to its destination.

Although there has been described to this point a particular embodiment for a method and structure for design of a real-time operating system messaging system interface, it is not intended that such specific references be considered as limitations upon the scope of this invention except in-sofar as set forth in the following claims.

What is claimed is:

1. A method of designing an interface for a real-ting operating system, the method comprising:
   providing a system interface, wherein said system interface communicates between said operating system and any communication drivers;
   using an application interface to allow
       communication and transfer of payload data between said operating system and said communication drivers via said system interface; and
       transfer of said payload data between application drivers and application objects; and
       wherein any changes made to said system interface, said application interface or said payload data will not affect the other interfaces.

2. The method as claimed in claim 1, wherein said operating system is pSOS.

3. The method as claimed in claim 1, wherein said operating system is Windows CE.

4. The method as claimed in claim 1, wherein said communication drivers include 1394 bus drivers.

5. The method as claimed in claim 1, wherein said communication drivers include EtherNet drivers.

6. The method as claimed in claim 1, wherein said communication drivers include xDSL drivers.

7. The method as claimed in claim 1, wherein said application interface is HAVi.

8. The method as claimed in claim 1, wherein said interface does not completely separate said payload data from said application interface, thereby reducing workload for a messaging system controller.

9. The method as claimed in claim 1, wherein said interface completely separates said payload data from said application interface.

* * * * *

UNITED STATES PATENT AND TRADEMARK OFFICE
CERTIFICATE OF CORRECTION

PATENT NO.    : 6,519,654 B1
DATED         : February 11, 2003
INVENTOR(S)   : Henry Fang and Jeffrey Nicholson It is certified that error appears in the above-identified patent and that said Letters Patent is hereby corrected as shown below:

<u>Column 4,</u>
Line 18, "real-ting" should read -- real-time --;

Signed and Sealed this

Twenty-eighth Day of October, 2003

JAMES E. ROGAN
*Director of the United States Patent and Trademark Office*